(No Model.)

J. C. MORRISON.
CUTTER FOR TRIMMING OR CUTTING BOILER TUBES.

No. 605,501. Patented June 14, 1898.

Witnesses
Eugene Ransom
Julia H. Ransom

Inventor
Joseph C. Morrison

UNITED STATES PATENT OFFICE.

JOSEPH C. MORRISON, OF AKRON, OHIO.

CUTTER FOR TRIMMING OR CUTTING BOILER-TUBES.

SPECIFICATION forming part of Letters Patent No. 605,501, dated June 14, 1898.

Application filed May 28, 1897. Serial No. 638,507. (No model.)

*To all whom it may concern:*

Be it known that I, JOSEPH C. MORRISON, a citizen of the United States, residing at Akron, in the county of Summit and State of Ohio, have invented a new and useful Device for Trimming the Ends of Boiler-Tubes, of which the following is a specification.

When boiler-tubes are set into the tube-sheets, more or less of the tubes project beyond the tube-sheets, and the excess has to be trimmed off preparatory to being beaded over. Heretofore this trimming has been done largely with the cold-chisel and hammer.

Now my invention consists of an apparatus or tool designed to cut off this excess of tube quickly and smoothly. This tool is also designed to cut the tubes off inside the tube-sheet when it may become necessary to remove them. To accomplish this end, it is necessary that the tool be quickly and accurately adjusted and quickly and easily operated. Following is a full and clear description of the tool designed to perform the work indicated, reference being made to the accompanying drawings, in which—

Figure 1:
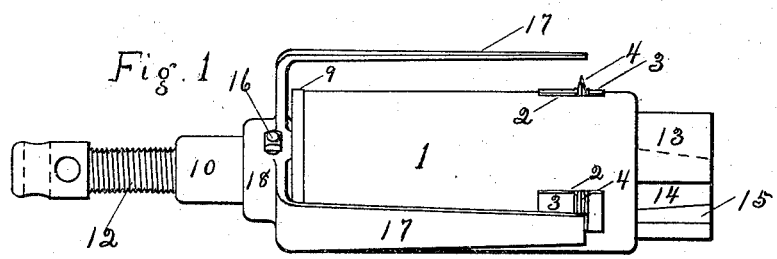
Figure 2:
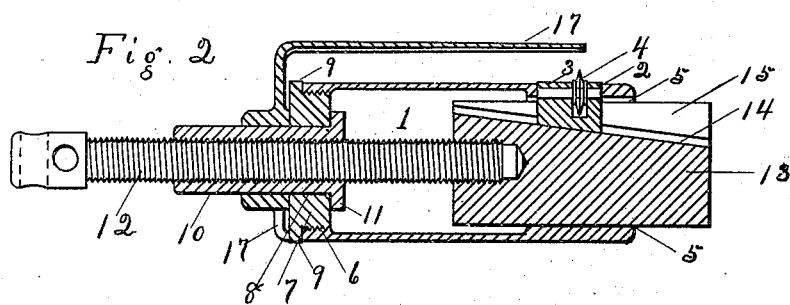
Figure 3:
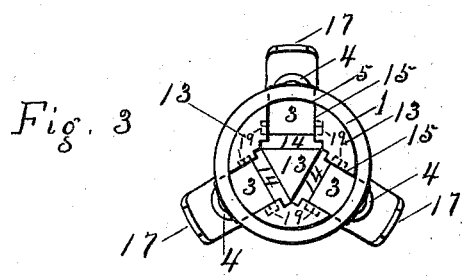
Figure 4:
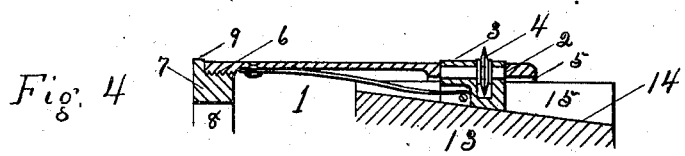

Figure 1 is a side view; Fig. 2, a longitudinal section through the center of Fig. 1; Fig. 3, a view of the end which is inserted in the tube, while Fig. 4 is a partial longitudinal section through the center of Fig. 1, showing a modification of the cutter-blocks and wedge.

Similar numerals refer to similar parts throughout the several views.

Referring to the accompanying drawings, 1 is a hollow cylindrical casing constructed of a suitable size for insertion within the tubes to be cut or trimmed, and said cylindrical casing is provided with a circle of slots or openings 2, through which project and easily slide the blocks 3, carrying the wheel cutters 4. The forward end of the casing is bored out to form a bearing 5, in which the core 13 can easily slide. Its opposite end 6 is threaded, and into this end is screwed the flanged collar 7, with central guide-opening 8. A threaded cylindrical feed nut or sleeve 10, with flanged end 11, is fitted into the opening 8, so as to allow free rotation of collar 7 around it as an axis and against flange 11. A driving-screw 12 is threaded through feed-nut 10, its rear or outer end having a convenient form for rotating the same. The forward end is screwed into or otherwise rigidly secured to the sliding piece or core 13. This piece 13 is constructed to slide freely in the opening 5 in the casing. This core 13 is provided with inclined slots 15, made longitudinally through it to come even with the openings 2 in the casing. The bottoms of these slots are inclined to the axis of the tool, as shown at 14, that they may act as wedges to force out or withdraw the cutters 4. That the cutters may be surely withdrawn the bottoms of the cutter-blocks are provided with flanges, as shown at 19, Fig. 3, which fit into and slide freely in grooves in the sides of slots 15, or they may be held on the incline 14 by a spring, as represented in Fig. 4, or by any other suitable device.

The cutter-blocks fit between the sides of the slots 15 and within the openings 2 in the casing. Their bases are beveled to accommodate them to the inclination of planes 14. They are, furthermore, provided with a transverse slot for the reception of wheel cutters and a hole for a pin upon which wheel cutters are intended to revolve. Upon feed-nut 10 and secured to it by a set-screw is the collar 18, with arms 17 projecting therefrom and bent forward in a direction parallel with the casing, the ends of which are intended to rest against the tube-sheet around the tube to be cut, forming a gage, by which proper adjustment may be secured within the tube.

Let it be borne in mind that all the parts of this tool when at work revolve together excepting the gage 18 and the nut 10, to which it is secured, these alone being at rest.

It is quite evident now, with the foregoing explanation of parts and their relations one to another, that if the tube-cutter be inserted in a boiler-tube, the gage adjusted and secured to feed-nut 10 and pressed against the tube-sheet and held still while the screw is being rotated, the wheel cutters will be forced outward by the progress of the wedge 13 between the cutter-blocks, and they will be simultaneously revolved around the inside of the tube. By continuing the operation the tube will be thereby necessarily cut off. By turning the screw in the reverse direction the cutters will be sufficiently withdrawn to allow the removal of the severed piece from the tool and the insertion in the next tube.

Changes in the form, proportion, and minor details of construction may be resorted to without departing from the principle of or sacrificing any of the advantages of this invention.

Having thus described my invention, what I claim, and desire to secure by Letters Patent, is—

1. A wedge formed by inclined planes 14, the bottoms of inclined slots and portions between the slots fitted to slide within bearing in casing, the sides of the slots made to coincide with the sides of the openings in the casing, substantially as set forth and for the purpose specified.

2. In an inside tube-cutting device the combination of an outside casing with openings for cutters; a sleeve fitted to revolve freely in the breech of the outer casing, this sleeve having an inside screw-thread through which passes the feed-screw and this feed-screw secured immovably to the core which carries the cutters, becoming the spindle by which these cutters are revolved, with the core having grooves with inclined bottoms formed in its mass and in the direction of its length that they may act as feed-wedges on the flanged cutter-blocks which are fitted into and engage them and also hold the cutter-blocks so firmly that the core may carry them in their working as well as their feeding motion; together with a gage as described.

In testimony that I claim the foregoing as my own I have hereto affixed my signature in the presence of two witnesses.

JOSEPH C. MORRISON.

Witnesses:
EUGENE RANSOM,
WILLIAM S. BROOKS.